US006774907B1

(12) United States Patent
Gupta

(10) Patent No.: US 6,774,907 B1
(45) Date of Patent: Aug. 10, 2004

(54) TINT TRANSFORMATION OF FILL

(75) Inventor: Niraj Gupta, New Delhi (IN)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 09/467,307

(22) Filed: Dec. 17, 1999

(51) Int. Cl.$^7$ ................................................. G09G 5/02
(52) U.S. Cl. ........................................................ 345/589
(58) Field of Search ................................ 345/441, 640, 345/606, 593, 590, 589, 470, 426

(56) References Cited

U.S. PATENT DOCUMENTS 4,667,596 A * 5/1987 Dotzel et al. ............... 101/211
4,958,272 A * 9/1990 Wake .......................... 364/518
5,822,453 A   10/1998 Lee et al. .................... 382/169

OTHER PUBLICATIONS

Photoshop for windows and Mactintosh, 1998, Peachpit Press, pp. 39, 145–147, 160–162, 179, 219–220, 224.*
Computer Graphics: Principles and Practice, 1996, Addison-–Wesley, 2$^{nd}$ edition, p. 482.*
Adobe Photoshop version 4.0, User Guide, "Chapter 9: Painting", pp. 199–226, 1996.

* cited by examiner

Primary Examiner—Mark Zimmerman
Assistant Examiner—Scott Wallace
(74) Attorney, Agent, or Firm—Fish & Richardson P.C.

(57) ABSTRACT

A computer-implemented method for generating a graphic fill includes selecting a tint curve and a tint vector for a graphical object; and applying a tint transform to the fill of the graphical object.

26 Claims, 7 Drawing Sheets

(1 of 7 Drawing Sheet(s) Filed in Color)

TINT TRANSFORMATION OF FILL

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights.

BACKGROUND OF THE INVENTION

FIELD OF THE INVENTION

The present invention relates to graphical fills, and more particularly, to automatic graphical fills in an electronic document.

Since the dawn of civilization, people have relied on graphic illustrations to communicate information. With the widespread availability of computers, the process of creating graphic illustrations has progressed from manual drafting techniques to computer-aided techniques. Although certain early computer graphics programs or application software can generate professional graphics in a fraction of the time required for hand drawn graphics, these computer programs can be quite complicated and/or difficult to use. In addition to requiring computer proficiency, many first generation computer graphics programs may require users to have artistic abilities and computer skill in order to generate professional illustrations. Thus, users of these programs may have to spend hours or days practicing with the system before becoming proficient in generating acceptable graphics.

One capability needed to enhance the appearance of the graphics in a document is the ability to change, modify and/or create certain areas in the document. Modem graphics programs provide tools such as painting tools and fill commands to change the color of pixels, and to modify and create areas in his or her document. These programs support certain fill capabilities to create gradual transitions between two or more colors, including linear, radial, angular, reflected or diamond gradient fills. A linear gradient fill creates a gradient from one point to another in a straight line. A radial gradient fill creates a gradient from a starting point to an ending point in a circular pattern. An angular gradient fill creates a gradient fill in a counterclockwise sweep around a starting point. A reflected gradient fill creates a gradient using symmetric linear gradients on either side of the starting point. Finally, a diamond gradient fill creates a gradient from a starting point outward in a diamond pattern, with the ending point defining one comer of the diamond.

At present, the user is limited in his or her options when the user desires to create designs with a wide range of color fills and gradient fills. These factors may prevent graphics from being used to present information when such a presentation would be the best way to communicate the information. For color image editing and manipulation, color or gradient fill operations should be flexible, and color manipulation of tints, shades and tones needs to be easy to apply for the graphic artist.

SUMMARY OF THE INVENTION

In one aspect, a computer-implemented method generates a graphic fill by selecting a tint curve and a tint vector for a graphical object; and applying a tint transform defined by the tint curve and vector to a fill of the graphical object.

Implementations of the method may include one or more of the following. The curve can be a spline. The tint curve can be adjusted to create a new visual effect. An effective value for the tint vector can be computed. The effective value for the tint vector can be expressed as one or more transcendental functions such as sine and cosine functions. The fill of the graphical object can have one or more color components. In this case, the method can apply the tint to the one or more color components of the object. The color components include red, green and blue. The method can adjust the brightness of the graphical object by adjusting the tint curve. Further, the direction of the tint vector can be adjusted to vary a fill pattern. The object can be an image region and the fill can be pixels of the image region. An anchor having two ends can be placed to allow users to edit the curve. The anchor can be transformed when the object is transformed, or can remain static when the object is transformed.

In a second aspect, a computer-implemented method generates a graphic fill by selecting a graphical object; applying a color gradient fill to the graphical object; creating a tint curve; and applying a tint transform defined by the tint curve and vector to the fill of a graphical object.

Advantages of the invention include one or more of the following. The tint transformation method adds a new dimension to currently available gradient or color fills and can generate fills that cannot be generated by current gradient/color fills. The use of tint transformation method makes opens new possibilities for design professionals. The tint transformation method allows the user to change brightness for the entire image or a portion thereof. Further, the tint transformation method modifies tint values at different parts of the fill in a controlled manner to generate visually interesting fills. The same gradient/color fill can generate multiple patterns when the tint transformation method is applied at different angles. Further, these powerful capabilities are provided with an intuitive, easy to learn interface. Thus, the method generates pleasing color patterns with a minimal amount of user time.

BRIEF DESCRIPTION OF THE DRAWINGS

The file of this patent contains at least one drawing executed in color. Copies of this patent with color drawings will be provided by the Patent and Trademark Office upon request and payment of the necessary fee.

The present invention will be readily understood by the following detailed description in conjunction with the accompanying drawings, wherein like reference numerals designate like structural elements, and in which.

DESCRIPTION OF THE PREFERRED EMBODIMENTS

Figure 1:
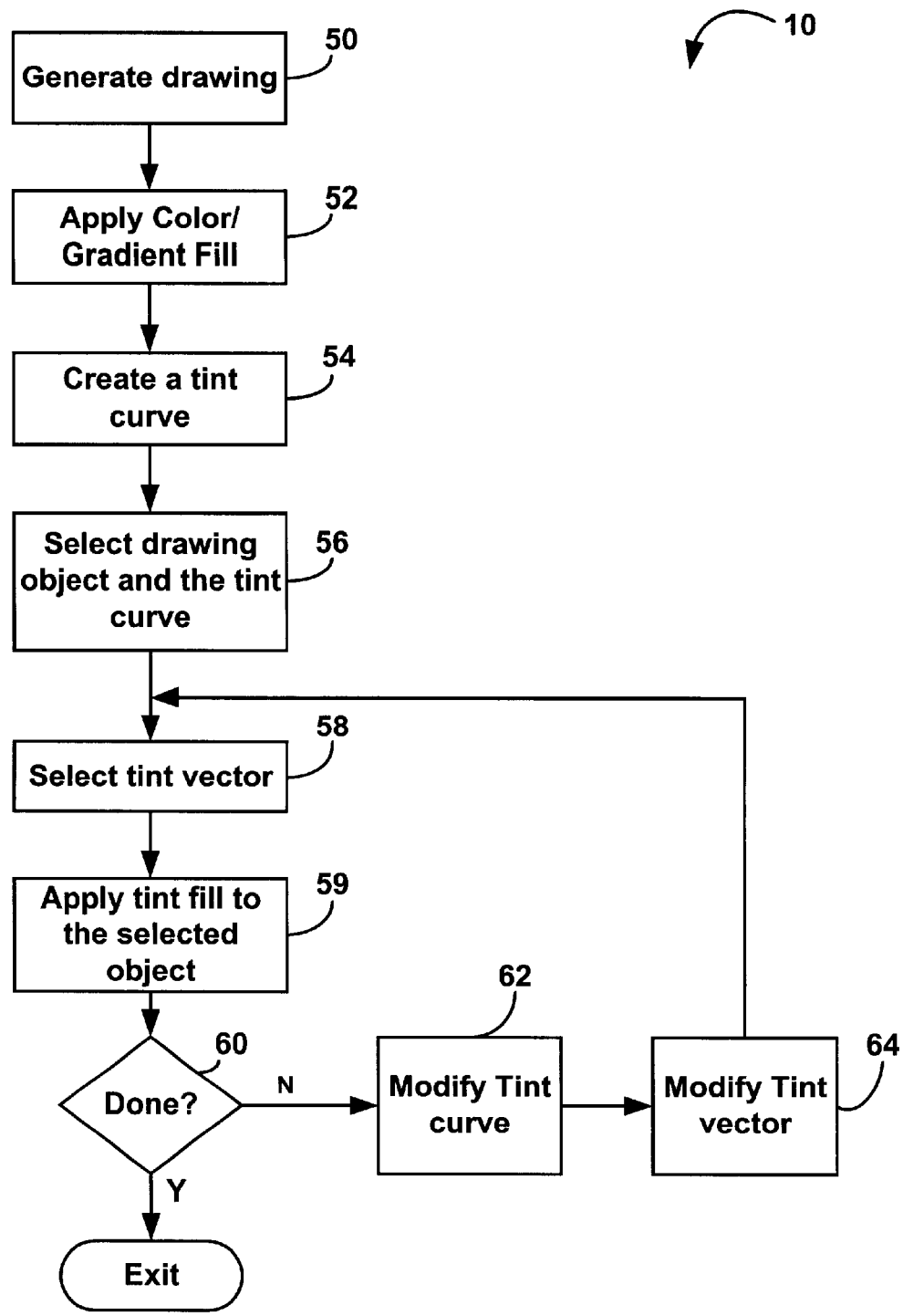
FIG. 1 is a flow diagram of a tint transformation technique according to one embodiment of the invention.

Referring now to FIG. 1, a process 10 for generating a drawing is shown. First, a user generates a drawing with one or more graphical objects (step 50). A drawing tool such as Adobe Photoshop can generate the graphical object. The objects can be edited through operations such as moving a graphical object to another position, stretching or shrinking the graphical object in a particular direction, enlarging or reducing the graphical object, and rotating the graphical object after displaying the object on a display unit.

The user then applies a color gradient fill using a gradient tool (step 52). The gradient tool allows the user to create a gradual transition between two or more colors. The user can choose from existing gradient fills, or can create and edit various custom gradient fills.

The user typically selects a part of the image that he or she wants to fill. If no selection is made, the gradient fill is applied to the entire active layer. The user positions a pointer in an image area where he or she wants to set the starting point of the gradient, and drag to define the length and direction of the gradient fill. Finally, the user releases the button where he or she wants to set the ending point of the gradient.

The user can also edit the gradient fill using a gradient editor dialog box. The dialog box allows the user to define the starting point and ending point of a new gradient, or to modify an existing gradient. The user can also add intermediate colors to a gradient to create a blend between two or more colors. Additionally, each gradient fill contains a transparency mask that controls the opacity of the fill at different locations on the gradient. For example, the user can set the starting color to 100% opacity and have the fill gradually blend into an ending color with 50% opacity.

After the color gradient fill has been applied, the user then creates a tint curve (step 54). The tint curve is a curve representing tint percentages that can be applied to the colors of the pixels of a fill. The fill can be a gradient fill. The tint curve is a free-form curve that has been divided into relatively simple intervals called segments, in order to represent the curve. There is a base spline curve as one of the functions for defining the free-form curve, and it is commonly called a B-Spline curve. The B-Spline curve can be defined by a plurality of control vectors. Moreover, a parameter corresponding to a junction between segments of B-Spline curve is called a knot. The value of the knot gradually increases from the start point toward the end point of the B-Spline curve. The tint curve can be manipulated or adjusted by the user to create different tint effects.

The user then selects the graphical object and then applies the tint transformation to the object (step 56). Next, the user selects a tint vector (step 58). The tint vector defines a direction at which the tint transformation will be applied. The pixels on either side of the vector are affected by the tint transformation. In effect, the tint vector defines the start point, direction and length of the tint transformation. This is very similar to gradient vector. The tint vector can be anchored at beginning and ending points on the object and the tint vector can scale with the object or can be fixed to the original anchor points. Based on the tint curve and tint vector, colors of a fill are transformed and applied to the selected object (step 59).

Next, the user reviews the displayed object and determines whether he or she is satisfied with the result of the tint transformation operation (step 60). If not, the tint curve can be modified (step 62). Similarly, the tint vector can also be modified (step 64). From step 64, the process 10 allows the user to iteratively apply the tint transformation by looping back to step 58. From step 60, if the user is satisfied with the graphic associated with a document, the process 10 exits.

Pseudo-code for the process of FIG. 1 is shown below:

Generate drawing with object to which the tint transformation is to be applied

Apply Color/Gradient Fill to the drawing object

Create a tint curve

Select drawing object and the Tint curve

Select tint Vector (Angle)

Apply tint transformation to the selected object (see flowchart)

If not done modify Tint Curve modify tint vector; and reselect object and reapply tint transformation endif In one implementation, the bottom left corner corresponds to position (0, 0) and the filled area to be in the quadrant where both x and y are positive.

Figure 2:
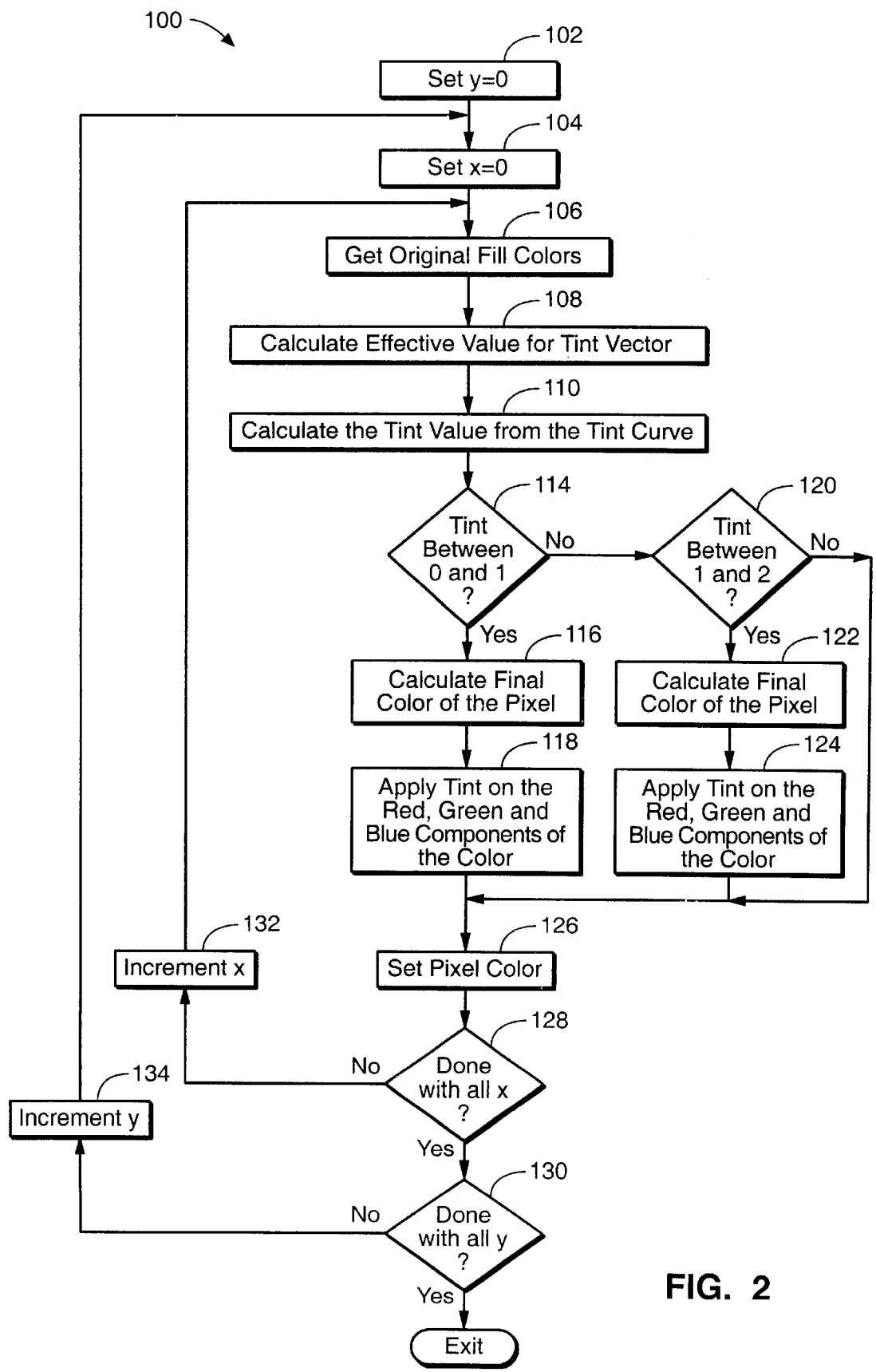
FIG. 2 is a flow diagram illustrating in more detail a tint transform technique used in the process of FIG. 1.

Referring now to FIG. 2, step 54 of FIG. 1 is shown in more detail as a process 100. First, the process 100 initializes the Y-axis to zero (step 102). Next, it initializes the X variable to zero (step 104). The process 100 then obtains a set of original fill colors (step 106). Next, the process 100 calculates an effective value for the tint vector (step 108). The process 100 then calculates the tint value from the tint curve such as a tint spline (step 110). Next, it checks whether the tint value is between zero and one. If so, the process 100 calculates the final color of the pixel (step 116). The process 100 then applies tint on the red, green and blue components of the color space of the selected object (step 118). From step 114, if the tint is greater than 1, the process 100 proceeds to step 120 where it checks whether the tint is between 1 and 2. If so, the process 100 calculates the final color of the pixel (step 122) and applies the tint on the red, green, and blue component of the color (step 124).

From step 118, 120 or 124, the process 100 sets the pixel color as previously determined (step 126). Next, the process 100 checks whether it has finished processing all X pixels (step 128). If not, the process increments the X value (step 132) before looping back to step 106. Alternatively, if all X values have been processed, the process 100 then checks whether all Y values have been processed (step 130). If not, the process proceeds to step 134 where the Y value is incremented. From step 134, the process 100 loops back to step 104 to process the next Y value. From step 130, if all pixels associated with the select objects have been processed, the process 100 exits.

Pseudo-code for the process of FIG. 2 is shown below. In this embodiment, the tint curve is expressed as a tint spline. First, the assumptions and inputs are defined as follows:

| | |
|---|---|
| Height | Height of the fill area |
| Width | Width of the fill area |
| Angle | Angle of Tint Vector with the positive X-Axis |
| FillColor (x, y) | Function which returns the original fill color of the pixel at location (x, y). Color is a (Red, Green, Blue) color |
| TintSpline (tintVector) | This is a normal B-Spline routine. It takes vector location as the parameter and returns the corresponding value on the curve. Return value is between (0 and 200) |

```
//For every row of the fill area
for y: = 0 till y := Height −1 step 1
begin
    //For every pixel on the row
    for x: = 0 till x := Width −1 step 1
    begin
        //Get the original Fill Color
        color := FillColor (x, y)
        //Calculate the effective value for the tint Vector
        tintVector: = x * Cos (Angle) + y * Sin (Angle)
        //Calculate the Tint value from the TintSpline
        tint := TintSpline (tintVector) / 100
        if 0 <= tint <= 1
        begin
            //Calculate final color of the pixel
            //Apply Tint on the red, green and blue components
            //of the color
            tintColor.Red := 255 - (255 − color.Red) * tint;
            tintColor.Green := 255 - (255 − color.Green) * tint
            tintColor.Blue := 255 - (255 − color.Blue) * tint
        end
        elseif 1 < tint <= 2
        begin
            //Calculate final color of the pixel
            //Apply Tint on the red, green and blue components
            //of the color
            tintColor.red := color.red * (2 − tint)
            tintColor.green := color.green * (2 − tint)
            tintColor.blue := color.blue * (2 − tint)
        end
        //Set the pixel color
        SetPixel(x, y, tintColor)
    end
end
```

Figure 3:
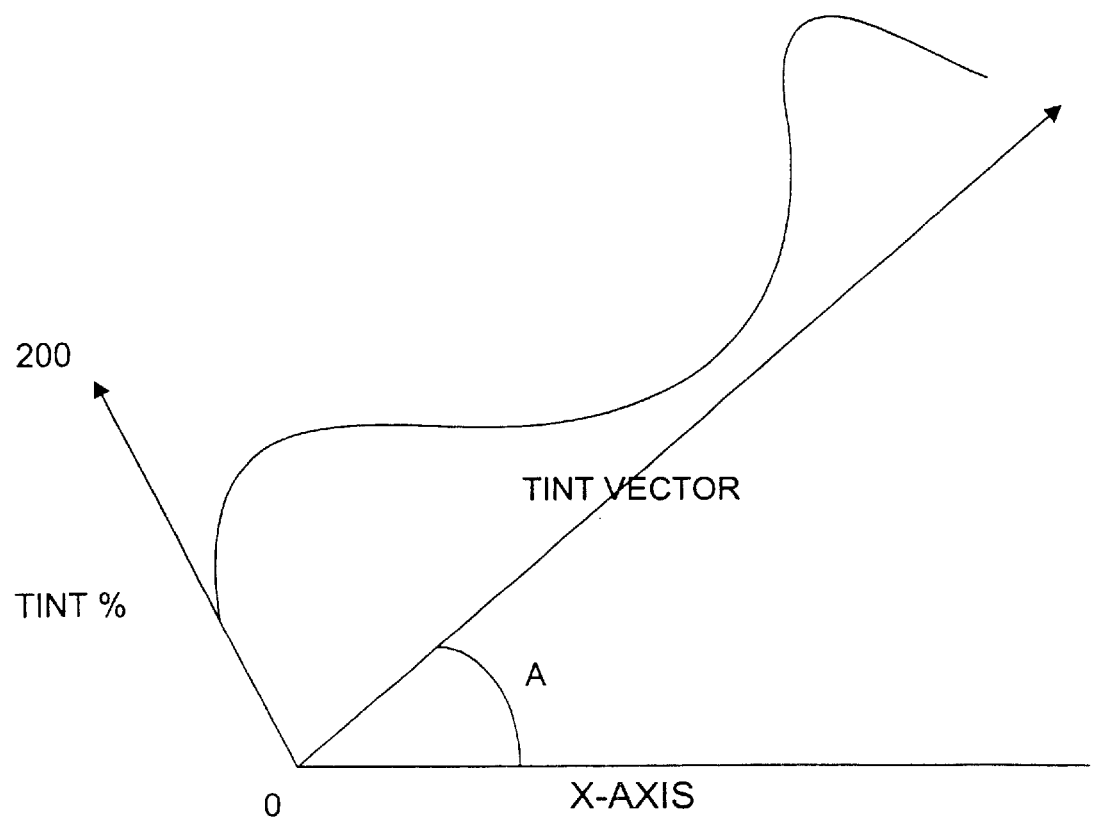
FIG. 3 is a chart illustrating the tint curve function.

Referring now to FIG. 3, a chart illustrating the tint spline function is shown. The chart generates for each pixel (x,y) a tint value and the resultant color. In this chart, the tint percentage of all pixels on any line orthogonal to the tint vector remains constant. A spline is used to define the tint percentage. Tint-Spline is defined as follows:

Tint–Spline: f(x)–>t, where t is the tint percentage corresponding to a value x on the tint vector, and 0<=t<=200, and for all x there exist a unique t.

The effective color of any pixel (x, y) is computed as 255−(255−Color (x, y))*tint spline (x cos A+y sin A)/100), if 0<=tint spline ((x cos A+y Sin A)<=100. Alternatively, the effective color can be computed as Color (x, y)*(2−tint spline (x cos A+y Sin A)/100), if 100<tint spline ((x cos A+y Sin A)<=200, where A is the angle of the tint vector with the positive x-axis.

In FIG. 3, a tint vector or axis makes an angle A with the x-Axis. The tint vector defines the tint axis (direction to which the tint-spline to be applied). The axis tint % value is orthogonal to the tint vector and represents the tint percentage that is the output of the function tintSpline(. .) used in the mathematical formnulae. For any point on the tint-vector, a corresponding value on the spline is calculated. In one embodiment, a suitable range for this value is 0–200. It is to be noted that the tint spline can be used with gradients and colors in Illustrator as well as Photoshop. The tint spline can also be applied to a rasterized object in Illustrator or a selection in Photoshop.

The tint spline function can be expressed as a set of piecewise polynomials that are often used to interpolate random-distributing points. The points at which the polynomials change are called "knots." Every interval between the neighboring knots is expressed by a different m-th order piecewise polynomial. Two neighboring m-th order polynomials have the same value, the same first order differential, . . . , and the same (m−1)-th order differential at a knot. But the m-th order differential is discontinuous at the knot. Additionally, the spline can be rendered by breaking it into short line segments using a parametric equation to define the short line segments. An implicit rendering algorithm based on a second order equation for a parabola can also be used to achieve improvements in speed. Also, a B-Spline curve which is non-uniform in the increase rate of knot can be rationalized, and a curve thus obtained is called a NURBS (Non-Uniform Rational B-Spine) curve.

Referring to FIG. 4, a tint spline is used to generate multiple patterns with the same gradient fill by changing its angle of application. The tint of the color is modified in the range of 0%–200%. 0% is no color, 100% is an actual color and 200% is black. For a filled area user defines a tint vector and a tint curve. The tint of a color is to modify the color's intensity.

Figure 4A:
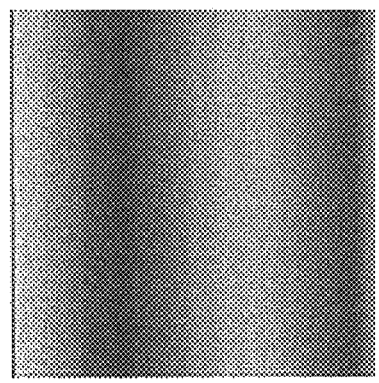
FIG. 4 shows a few exemplary tint transformed gradient fills in accordance with the invention.
Figure 4B:
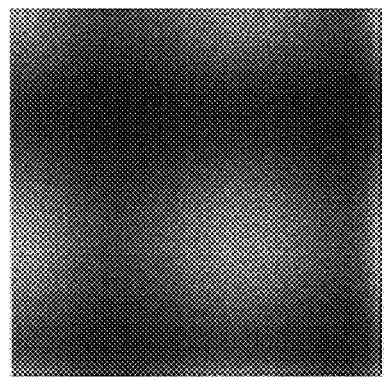
Figure 4C:
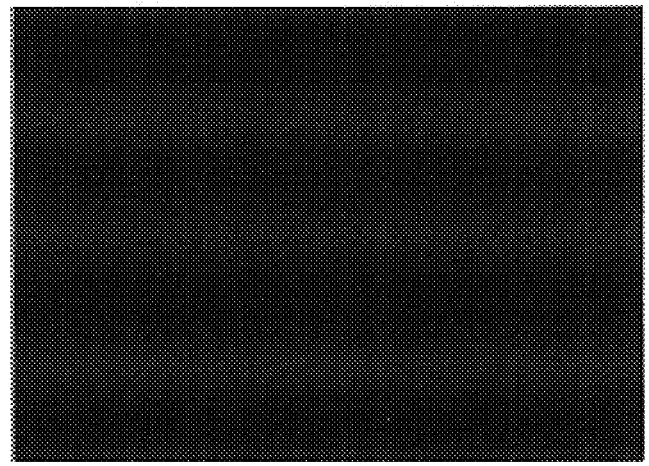
Figure 4D:
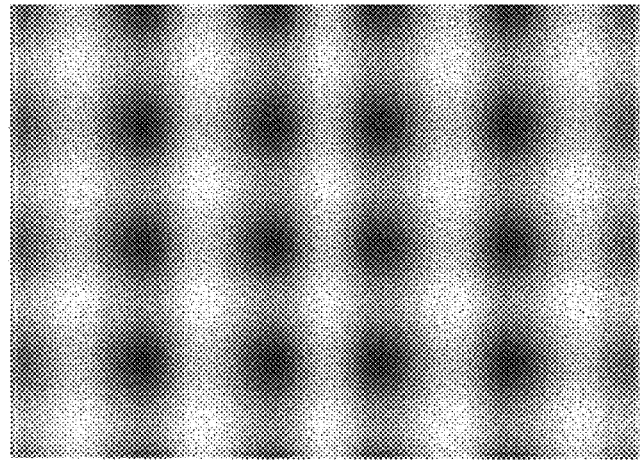

FIG. 4a is a gradient and FIG. 4b represents the result generated by applying a tint-transformation with its tint vector along the y-axis. In this embodiment, the tint amplitude varies between 100 and 200. The shape of the spline approximates a sine curve. FIG. 4c is generated by applying a tint-transformation to a plane blue color-box. The applied tint-transformation has its vector along the y-axis. The tint amplitude of FIG. 4c varies between 100 and 200. Further, applying a tint-transformation to a gradient generates FIG. 4d. The applied tint-transformation has its vector along the y-axis, and the tint amplitude varies between 40 and 100.

Figure 5:
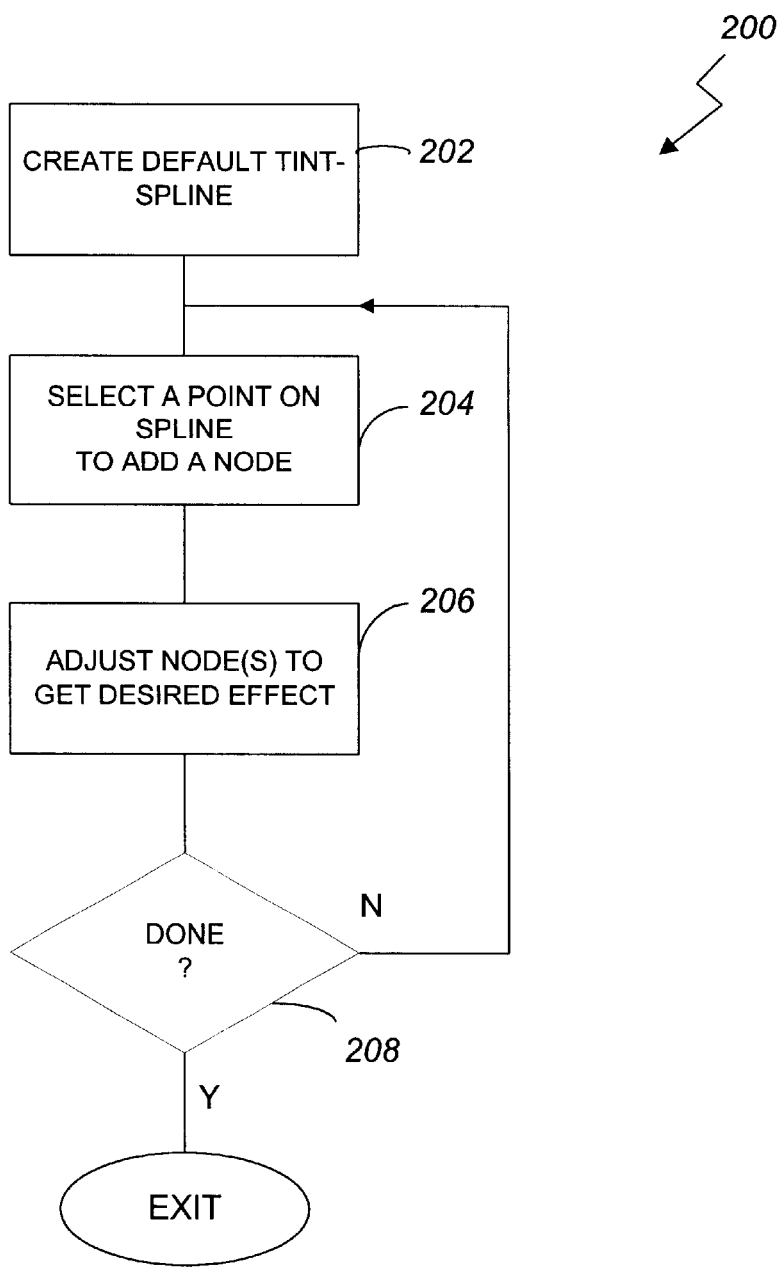
FIG. 5 is a flow diagram of a process for editing a tint curve.

FIG. 5 is a flow chart of a process 200 for creating and editing a tint-curve. First, a default tint-curve such as a straight line is generated (step 202). Next, a user selects a particular point on the tint-curve to create an editable node (step 204). The user can adjust the position of the node to create different tint effects (step 206). The user can adjust the node by dragging-and-dropping the node on the curve. While the user is adjusting the node, the process 200 handles the constraints as specified in the tint-spline definition. Next, the process 200 checks if the user is satisfied with the effect of the tint transformation (step 208). If not, the process 200 loops back to step 204 to let the user continue his or her editing activity. Otherwise, the process 200 exits.

Pseudo-code to create and edit a tint-curve is shown below:
  A. Select a Tint-Transformation Tool. This will create a Default Tint-Curve which is a straight line, defined by two nodes at the ends of the line.
  B. Add a node by clicking at any point on the curve. It generates a new node.
  C. Adjust the node to get the desired result. Click on any node(s) and drag it to the desired location. This will modify the tint-curve accordingly.
  D. Repeat step B and C till the desired Tint-Curve is created.

Figure 6:
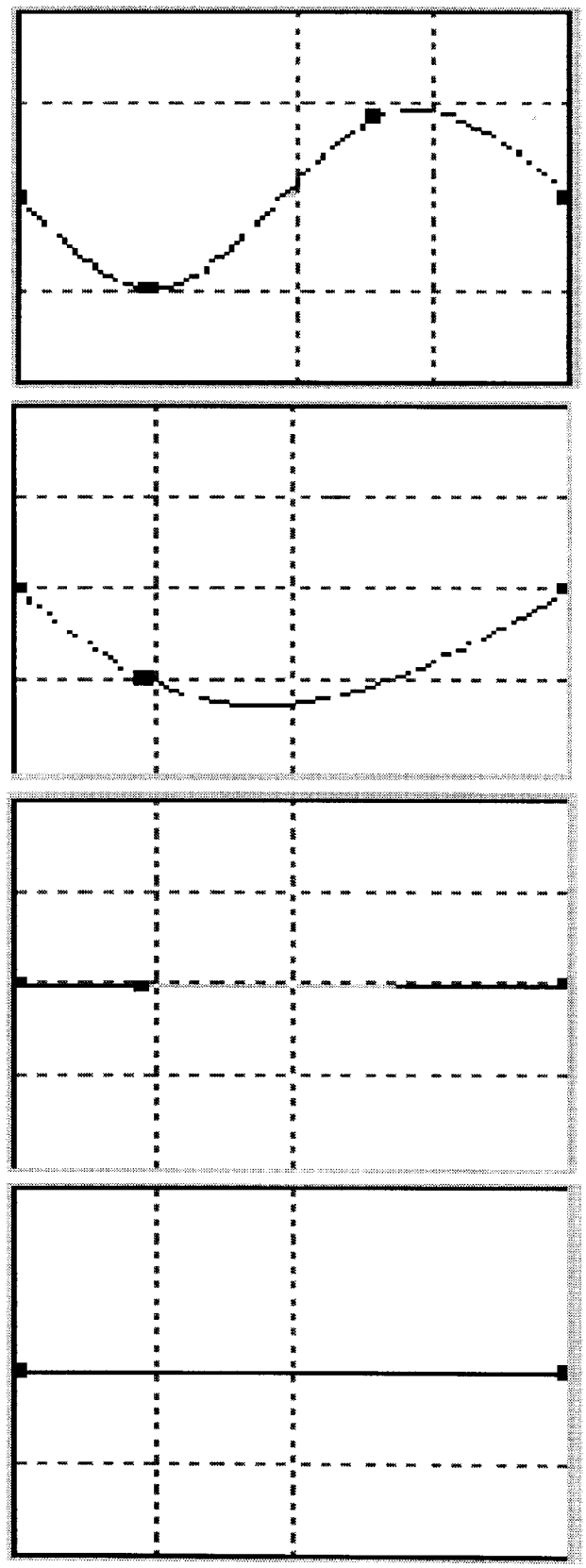
FIGS. 6A–6D in combination show an exemplary user interface for editing a tint-curve.

FIGS. 6A–6D illustrate one exemplary graphical editor for a tint-curve. FIG. 6A shows that the editor displays a default window with a straight line, defined by two nodes at the ends of the line. FIG. 6B shows that the user has selected a point on the line of FIG. 6A. This point is a node that the user can drag-and-drop to vary the tint-transformation effect. FIG. 6C shows one adjustment to the node and its impact on the tint-curve. FIG. 6D shows that the user had created a desired tint-curve that is a sinusoidal wave using two nodes.

As shown above, the tint transformation method modifies tint values at different parts of the fill in a controlled manner to generate visually interesting fills. The same gradient/color fill can generate multiple patterns when the tint transform is applied at different angles. Further, the tint transformation method allows the user to change brightness for the entire image or a portion thereof.

Figure 7:
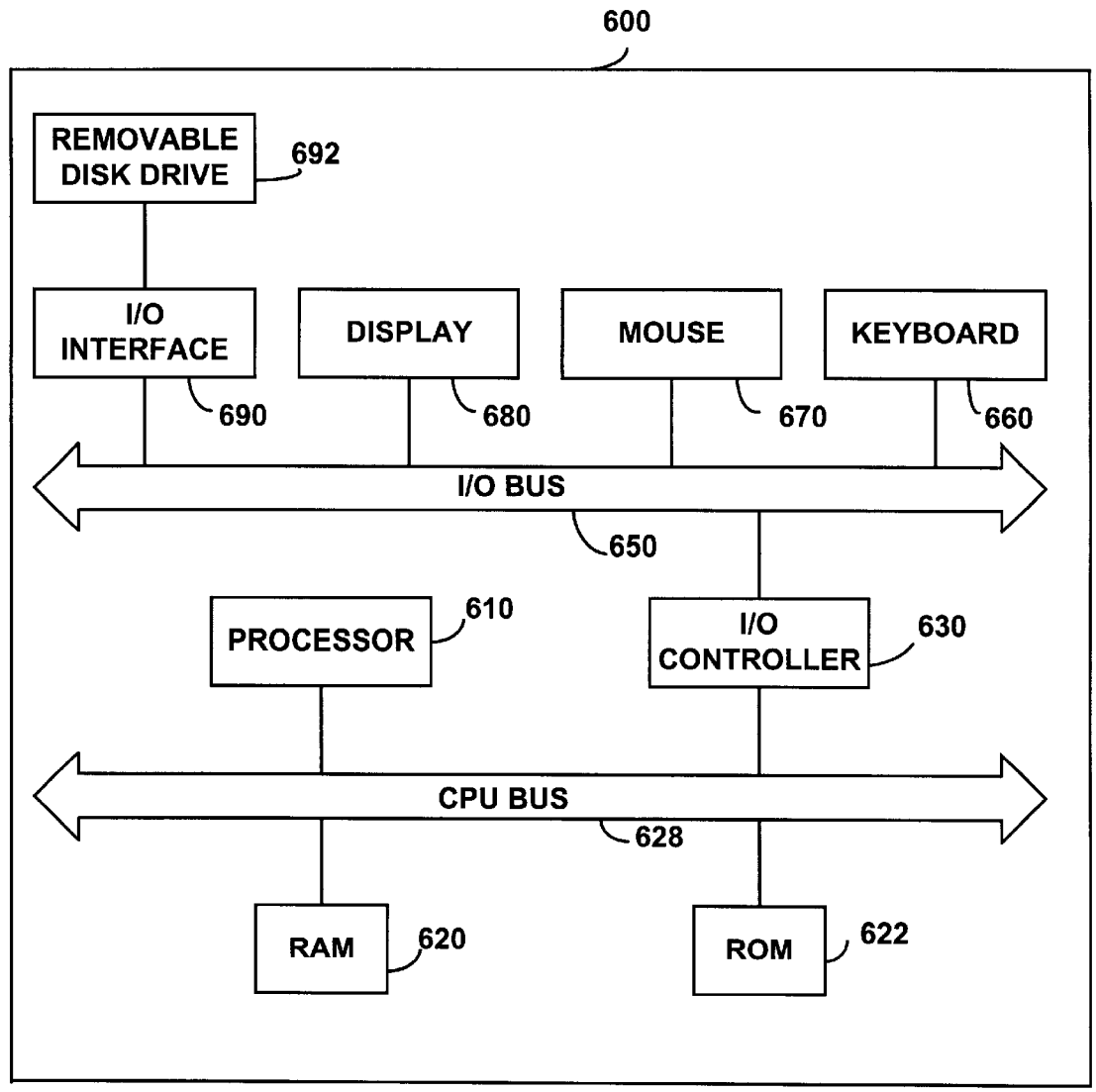
FIG. 7 is a block diagram of an exemplary computer system for automatically placing graphical patterns in accordance with the invention.

The invention may be implemented in digital hardware or computer software, or a combination of both. Preferably, the invention is implemented in a computer program executing in a computer system. Such a computer system may include a processor, a data storage system, at least one input device, and an output device. FIG. 7 illustrates one such computer system 600, including a processor (CPU) 610, a RAM 620, a ROM 622 and an I/O controller 630 coupled by a CPU bus 628. The I/O controller 630 is also coupled by an I/O bus 650 to input devices such as a keyboard 660, a mouse 670, and output devices such as a monitor 680. Additionally, one or more data storage devices 692 is connected to the I/O bus using an I/O interface 690.

Further, variations to the basic computer system of FIG. 7 are within the scope of the present invention. For example, instead of using a mouse as user input devices, a pressure-sensitive pen, digitizer or tablet may be used.

The above-described software can be implemented in a high level procedural or object-oriented programming language to operate on a dedicated or embedded system. However, the programs can be implemented in assembly or machine language, if desired. In any case, the language may be a compiled or interpreted language.

Each such computer program can be stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

Other embodiments are within the scope of the following claims.

What is claimed is:

1. A computer-implemented method for generating a fill of a graphical object, comprising applying a tint transform defined by a tint curve and a tint vector to the fill of the graphical object, wherein the tint vector is anchored to the end points of the graphical object.

2. The method of claim 1, wherein the tint curve is a spline.

3. The method of claim 1, further comprising adjusting the tint curve to create a new visual effect.

4. The method of claim 1, wherein applying the tint transform to the fill of the graphical object further comprises for each pixel:

using the (x,y)-coordinates of the pixel to determine a position along the tint vector;

using the position along the tint vector to determine a tint amount from the tint curve; and using the tint amount to tint the pixel's color.

5. The method of claim 4, wherein the position along the tint vector for a pixel having coordinates (x,y) in the fill of the graphical object is given by $x \cos(\theta)+y \sin(\theta)$, where $\theta$ is the angle between the tint vector and the positive x-axis.

6. The method of claim 1, wherein the fill of the graphical object has one or more color components, further comprising applying the tint transform to the one or more color components of the object.

7. The method of claim 5, wherein the color components include red, green and blue.

8. The method of claim 1, further comprising adjusting the brightness of the graphical object by adjusting the tint curve.

9. The method of claim 1, further comprising adjusting the direction of the tint vector to vary the fill of the graphical object.

10. A computer-implemented method for generating a fill of a graphical object, comprising:

associating a tint curve and a tint vector with the graphical object, wherein the tint vector is anchored to the end points of the graphical object; and applying a tint transform defined by the tint curve and the tint vector to the fill of the graphical object.

11. The method of claim 10, further comprising adjusting the tint curve to create a new visual effect.

12. The method of claim 10, wherein applying the tint transform to the fill of the graphical object further comprises for each pixel:

using the (x,y)-coordinates of the pixel to determine a position along the tint vector;

using the position along the tint vector to determine a tint amount from the tint curve; and using the tint amount to tint the pixel's color.

13. The method of claim 12, wherein the position along the tint vector for a pixel having coordinates (x,y) in the fill of the graphical object is given by $x \cos(\theta)+y \sin(\theta)$, where $\theta$ is the angle between the tint vector and the positive x-axis.

14. The method of claim 10, wherein the fill of the graphical object has one or more color components, further comprising applying the tint transform to the one or more color components of the object.

15. The method of claim 14, wherein the color components include red, green and blue.

16. The method of claim 10, further comprising adjusting the brightness of the graphical object by adjusting the tint curve.

17. The method of claim 10, further comprising adjusting the direction of the tint vector to vary the fill of the graphical object.

18. The method of claim 10, wherein the object is an image region and the fill is pixels of the image region.

19. The method of claim 10, wherein the tint curve is transformed when the graphical object is transformed.

20. The method of claim 10, wherein the tint curve remains static and is not transformed when the graphical object is transformed.

21. A computer program tangibly stored on a computer-readable medium comprising instructions for causing a processor to:

associate a tint curve and a tint vector with a graphical object, wherein the tint vector is anchored to the end points of the graphical object; and apply a tint transform defined by the tint curve and tint vector to a fill of the graphical object.

22. A computer program tangibly stored on a computer-readable medium for generating a fill of a graphical object, comprising instructions for causing a processor to apply a tint transform defined by a tint curve and a tint vector to the fill of the graphical object, wherein the tint vector is anchored to the end points of the graphical object.

23. The computer program product of claim 21, wherein for each pixel in the graphical object, the instructions for causing the processor to apply the tint transform comprises instructions for causing the processor to:

use the (x,y)-coordinates of the pixel to determine a position along the tint vector;

use the position along the tint vector to determine a tint amount from the tint curve; and use the tint amount to tint the pixel's color.

24. The computer program product of claim 23, wherein the position along the tint vector for a pixel having coordinates (x,y) in the fill of the graphical object is given by x cos(θ)+y sin(θ), where θ is the angle between the tint vector and the positive x-axis.

25. The computer program product of claim 22, wherein for each pixel in the graphical object, the instructions for causing the processor to apply the tint transform comprises instructions for causing the processor to:

use the (x,y)-coordinates of the pixel to determine a position along the tint vector;

use the position along the tint vector to determine a tint amount from the tint curve; and use the tint amount to tint the pixel's color.

26. The computer program product of claim 25, wherein the position along the tint vector for a pixel having coordinates (x,y) in the fill of the graphical object is given by x cos(θ)+y sin(θ), where θ is the angle between the tint vector and the positive x-axis.

* * * * *